United States Patent [19]
Bakke et al.

[11] Patent Number: 5,623,701
[45] Date of Patent: Apr. 22, 1997

[54] DATA COMPRESSION METHOD AND STRUCTURE FOR A DIRECT ACCESS STORAGE DEVICE

[75] Inventors: Brian E. Bakke; Daniel F. Moertl; Bruce M. Walk, all of Rochester, Minn.

[73] Assignee: International Business Machines Corporation, Armonk, N.Y.

[21] Appl. No.: 468,712

[22] Filed: Jun. 6, 1995

[51] Int. Cl.$^6$ .............................. G06F 12/00; G06F 17/30
[52] U.S. Cl. ............... 395/888; 395/497.01; 395/497.02; 395/497.04; 395/612
[58] Field of Search .................................. 395/888, 600, 395/404, 497.01, 497.02, 497.04; 364/715.02

[56] References Cited

U.S. PATENT DOCUMENTS

| | | | |
|---|---|---|---|
| 4,229,808 | 10/1980 | Hui | 369/48 |
| 4,499,539 | 2/1985 | Vosacek | 395/600 |
| 5,021,946 | 6/1991 | Korty | 395/600 |
| 5,113,512 | 5/1992 | Miki et al. | 395/425 |
| 5,237,675 | 8/1993 | Hannon, Jr. | 395/425 |
| 5,247,638 | 9/1993 | O'Brien et al. | 395/425 |
| 5,313,585 | 5/1994 | Jeffries et al. | 395/411 |
| 5,325,347 | 6/1994 | Sako | 369/48 |
| 5,357,607 | 10/1994 | Sathi et al. | 395/166 |
| 5,375,233 | 12/1994 | Kimber et al. | 395/600 |
| 5,388,093 | 2/1995 | Yoshida et al. | 369/124 |
| 5,390,315 | 2/1995 | Blandy et al. | 395/439 |
| 5,394,534 | 2/1995 | Kulakowski et al. | 395/425 |
| 5,463,772 | 10/1995 | Thompson et al. | 395/600 |
| 5,535,372 | 7/1996 | Benhase et al. | 395/500 |
| 5,537,658 | 7/1996 | Bakke et al. | 395/888 |
| 5,551,003 | 8/1996 | Mattson et al. | 395/463 |
| 5,555,371 | 9/1996 | Duyanovich et al. | 395/182.11 |

OTHER PUBLICATIONS

Brodie et al. Pat. Appln. S.N. 08/343,316 filed Nov. 22, 1994 —Method and Means for Managing Linear Mapped Address Spaces Storing Compressed Data at the Storage Subsystem Control Unit or Device Level.

*Primary Examiner*—Paul V. Kulik
*Attorney, Agent, or Firm*—Joan Pennington

[57] ABSTRACT

A data compression method and compression data structure are provided for a direct access storage device (DASD). The DASD is segmented into a plurality of compression groups. Each of the compression groups has a fixed logical size. A directory table is written within each of the compression groups. Each compression group has at least one compressed data region on which compressed data can be written and an exception region on which compressed data exceptions can be written. The compressed data exceptions include updated compressed data which exceeds an original storage space for corresponding original compressed data.

20 Claims, 5 Drawing Sheets

DATA COMPRESSION METHOD AND STRUCTURE FOR A DIRECT ACCESS STORAGE DEVICE

FIELD OF THE INVENTION

The present invention relates to a data compression method and structure for a direct access storage device (DASD) using fixed block architecture (FBA).

DESCRIPTION OF THE PRIOR ART

Computers often include auxiliary memory storage units having media on which data can be written and from which data can be read. Disk drive units or DASDs, often incorporating stacked, commonly rotated rigid magnetic disks, are used for storage of data in magnetic form on the disk surfaces. Data is recorded in radially spaced data information tracks arrayed on the surfaces of the disks. Transducer heads driven in a path toward and away from the drive axis write data to the disks and read data from the disks. A data cylinder includes a set of corresponding data information tracks for the stack of disk surfaces. In a DASD using fixed block architecture (FBA), the data information tracks are divided into equally sized segments or sectors. Each sector is assigned a number or logical block address (LBA). Typically, a data file is written and read using consecutive LBA's, trackfollowing on the data information tracks of successive consecutive logical data surfaces from the starting LBA. Fragmentation occurs when blocks of data from the file are written to available discontinuous sectors at different locations on the DASD.

To utilize the relatively limited amount of the available data storage capacity of DASDs, data may be stored by a compression technique. However to effectively utilize DASDs, response time should be both predictable and fast. Response time consistency is an extremely important consideration. In cases of heavy work load, response time must at least be predictable. For batch operations, businesses typically rely on certain windows of low system load to run background applications. If time requirements for these applications are not consistent and predictable, it becomes difficult to schedule the work flow, potentially resulting in windows of time where the system is heavily overloaded.

The operational characteristics of DASDs that do not use data compression provide a yardstick by which consistency and operational predictability are measured. When compression is enabled on commercial systems, response time consistency should be similar to DASD subsystem without data compression.

Applying data compression techniques for DASD on a system with fixed page sizes results in compressed pages of variable size that can subsequently change in size as they are updated over time. When these compressed pages are stored on DASD that use a fixed block architecture (FBA) or fixed sector size, a mechanism must be provided to manage this variation in size. Current techniques typically move the data to some discontinuous area on the DASD when confronted with the case where subsequently updated compressed data has grown to the point where it no longer fits in the original space. This results in fragmentation when the updated compressed page is a member of a larger sequential data block. Fragmentation can lead to wide variations in performance as data is accessed sequentially at later points in time. Performance degradation can result from the additional mechanical seek times incurred as the actuator moves to access pages that are located on different tracks, out of order. To date, this characteristic of compressed data has been a major inhibitor to using data compression in high performance computer systems, such as, an IBM AS/400 commercial system.

It is highly desirable to provide an improved data compression method and structure for a direct access storage device (DASD) having performance and response time consistency similar to a DASD subsystem without compression.

SUMMARY OF THE INVENTION

Important objects of the present invention are to provide an improved data compression method and structure for a direct access storage device (DASD) and to provide such method and structure that overcomes many of the disadvantages of prior art arrangements.

In brief, a data compression method and compression data structure are provided for a direct access storage device (DASD). The DASD is segmented into a plurality of compression groups. Each of the compression groups has a fixed logical size. A directory table is written within each of the compression groups. Each compression group has at least one compressed data region on which compressed data can be written and an exception region on which compressed data exceptions can be written. The compressed data exceptions include updated compressed data which exceeds an original storage space for corresponding original compressed data.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
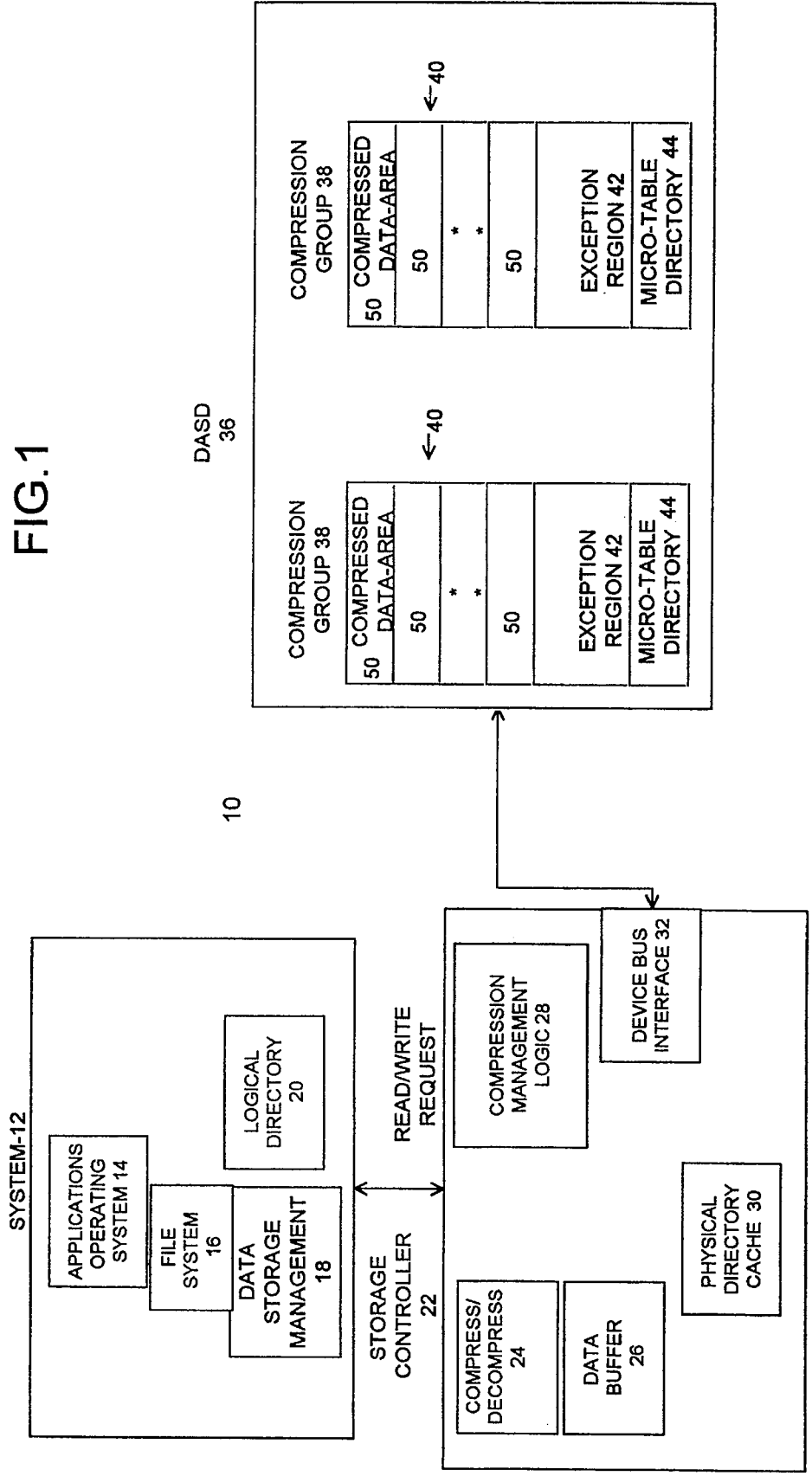
FIG. 1 is a block diagram illustrating a system employing a storage controller for implementing integrated direct access storage device (DASD) compression and a data compression structure in accordance with the present invention.

Referring now to the drawings, in FIG. 1 there is illustrated a block diagram representation of an exemplary system generally designated by 10 for performing a data compression method of the invention. As illustrated, the exemplary system 10 includes a data processing or host system generally designated by 12. Host system 12 includes an application operating system 14, a file system 16 and a direct access storage device (DASD) data storage management function 18 used to store data onto at least one DASD 36. DASD storage management function 18 includes a logical directory 20 that stores the logical block addresses where data is placed on the associated DASD or DASDs 36.

Data is accessed on the DASD 36 through a storage controller generally designated by 22 that compresses data when it is written to the DASD and decompresses data when it is read from the DASD. Storage controller 22 includes a compression and decompression functional block 24, a data buffer 26 for storing data, a compression management logic block 28 for performing address translation and a physical directory cache 30 that is used for storing cache directory elements of the DASD directory generated within the storage controller 22. Storage controller 22 receives data pages from the host system 12, compresses it, and creates compressed data pages to be stored in sectors, appending compression headers that enable directory recovery to occur. Once the physical location of data on DASD is determined by the compression management logic 28, compressed data is passed to or received from the DASD 36 via a device bus interface 32.

DASD 36 includes a plurality of variable sized compression groups 38, each compression group is used for storing related host system data. Each compression group includes a compressed data area 40 for storing original and updated compressed data, an exception region 42 for storing updated compressed pages that are larger than their original allocated space and a directory or micro table 44 for locating data within the compression group. The compressed data area 40 consists of multiple compression regions 50. A feature of the invention is that compressed data is organized on DASD 36 so that the spatial relationships of related data are maintained within each compression group 38, together with necessary space management parameters. The resulting structure of the compressed data provides consistent performance in a commercial environment and minimizes performance impact due to using data compression.

Figure 2:
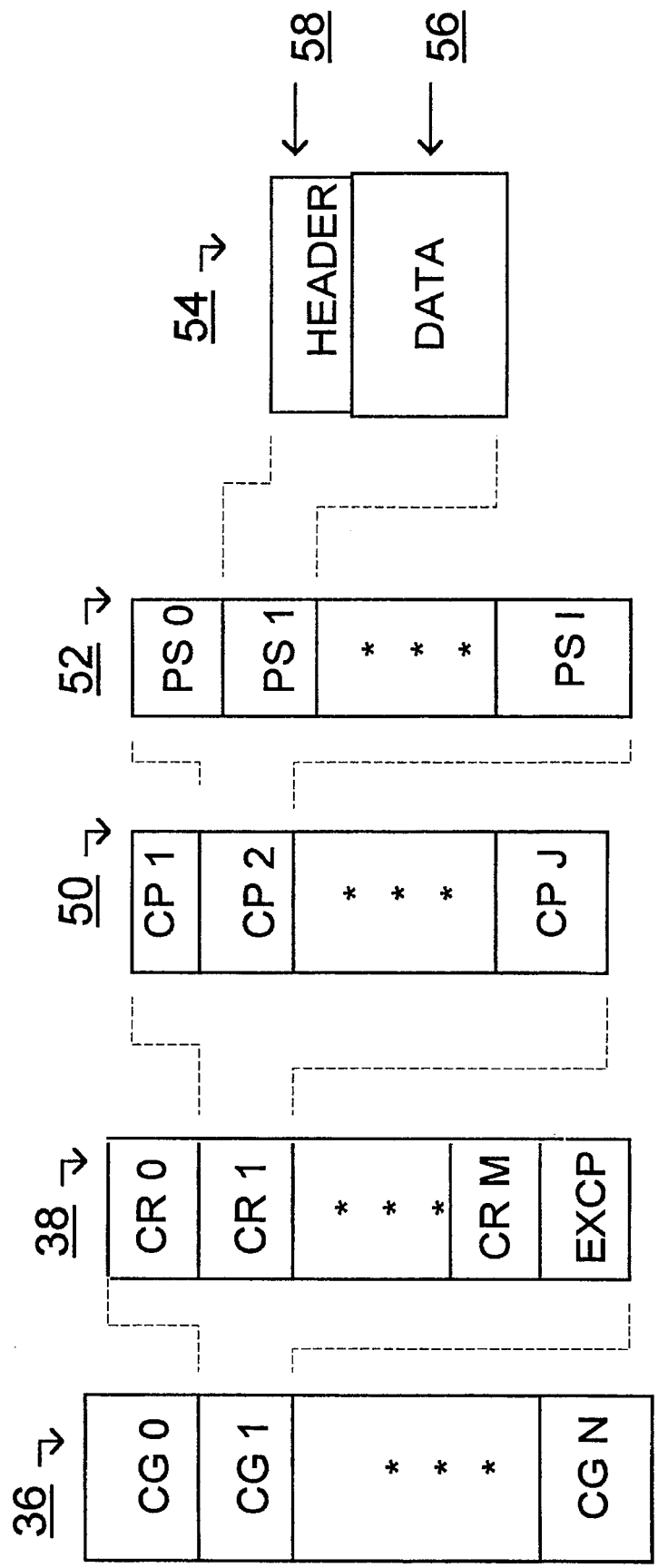
FIG. 2 is a block diagram illustrating a data compression structure in accordance with the present invention.

Having reference now to FIG. 2, the data compression structure is illustrated. Segmentation of data on DASD is provided into multiple finite blocks or compression groups 38 (CG0 through CG N). Each compression group 38 is managed as an integral unit with space allocated flexibly within it according to a compressed data hierarchy of the invention. Data within each compression group 38 represents a fixed logical address range from the view of host system 12 with variations in physical size depending on the compression characteristics of the stored data. A compression group 38 is not limited to any particular size; however, data storage efficiencies are realized when the compression group size is chosen to be as large or larger than the majority of data blocks that the host system 12 allocates. It should also be relatively large with respect to the system page size. The compression group size is chosen to generally match file system storage management allocation and access patterns. For an IBM AS/400 computer system 12, the compression group size has been selected to be 1 MB with a system page size of 4K. Within the compression group 38, data is stored sequentially in the order dictated by the system addressing model. Each system data page is compressed individually within the group and stored in the physical space equivalent to its compressed size. There is no requirement that compression groups 38 maintain any spatial relationship with respect to one another.

Each compression group 38 consists of a variable number of compression regions 50, and is therefore variable in terms of physical size. As shown, each compression group 38 physically comprises an integral number of compression regions 50 (CR 0 through CR M). Compression regions 50 are used to provide a convenient granularity for managing disk space. Although any size could be used including a sector, the functionally indivisible, minimum addressable data area on DASD 36, selecting the size of the compression region 50 to match the disk geometry, for example, a track size or other implementation dependent size, is beneficial. The use of compression regions 50 is optional, although it contributes to the realization of efficient implementations.

In FIG. 2, the exception and administration region (EXCP) includes the exception region 42 and the micro table directory 44. EXCP region is predefined space within the compression group 38 for compressed pages that no longer fit in the space currently allocated for them and directory data. The EXCP region consists of an integral number of compression regions 50. Although the EXCP region does affect the sequential storage of data within a compression group 38, exception region 42 ensures that updated data is not stored far from its original storage space and neighboring file data. In many cases, the use of the small computer system interface (SCSI) Skip Read and Skip Write Commands allow for the acquisition of exception region stored data along with its neighboring pages in a single operation. The SCSI Skip Read and Skip Write Commands utilize a skip mask to set selected sectors to be read or written with other sectors set as zero that are skipped. Even when this cannot be accomplished, a long seek is avoided due to the close proximity of the EXCP region. Directory information to aid in the location of data within each block is kept with the data in each compression group 38. Similarly, the close proximity of the directory information to its related data minimizes DASD seeks when the directory must be accessed. In practice, directory information also is cached in the storage controller 22, minimizing updates of directory information in the compression group micro table directory 44.

Each compression region 50 includes multiple compression pages 52 (CP 1 to CP J). The size of the compression page 52 advantageously is selected to be equal to the system page size. This eliminates the need for the DASD subsystem controller 22 to perform read-modify-write operations to a compressed page 52 where only a portion of the data has been modified by the host system 12. The compression region 50 consists of a fixed number of physical sectors 54 containing a variable number of compression pages 52. Physical size of compression page 52 is 1 to n physical sectors 54 (PS 0–PS i) dependent on the particular compression ratio. Compression pages 52 may span compression regions 50 within a compression group 38.

The physical sector 54 includes compressed data 56 and an optional physical sector header 58 for control information.

Figure 3:
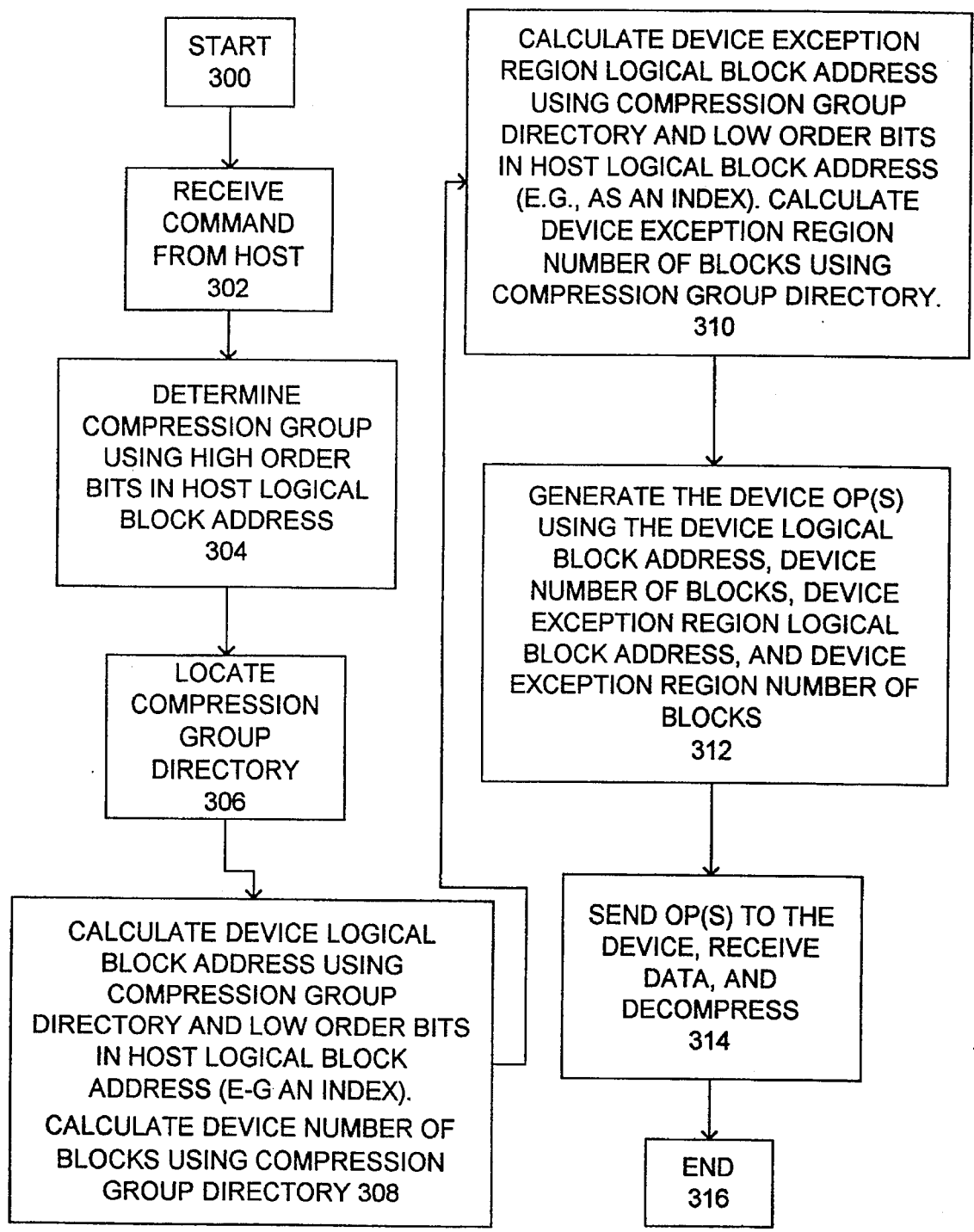
FIGS. 3–5 are flow charts illustrating logical steps performed by a storage controller of the DASD compression system of FIG. 1 in accordance with the present invention.

Referring now to FIG. 3, there is shown a flow chart illustrating sequential operations for a read sequence starting at a block 300. First a read command from host computer 12 is received by the storage controller 22 as indicated at a block 302. Storage controller 22 determines a compression group 38 using the high order bits in host logical block address (LBA) as indicated at a block 304. Storage controller 22 locates the compression group directory from physical directory cache 30 if present, or directly from the DASD 36 as indicated at a block 306.

Next storage controller 22 determines the physical offset and length of the target page or pages to be read. As indicated at a block 308, storage controller 22 calculates the DASD logical block address using the compression group directory and low order bits in the host logical block address, for example, as an index and calculates number of blocks using compression group directory. With a single or multiple page read operation with exceptions, then storage controller 22 calculates the LBA of the exception region 42 using the compression group directory and low order bits in the host logical block address, for example, as an index and calculates the device exception region number of blocks using compression group directory as indicated at a block 310. Then storage controller 22 generates the device operation or operations using the calculated device logical block address, device number of blocks, device exception region logical block address, and device exception region number of blocks as indicated at a block 312. When the read operation includes exceptions and the exceptions are within the span of a SCSI skip operation, storage controller 22 generates the skip read command for this operation. Otherwise, when the exceptions are not within the span of a SCSI skip operation, controller generates two operations. Storage controller 22 send the commands or operations to the DASD 36, receives and decompresses the data as indicated at a block 314. This completes the read sequence.

Figure 4:
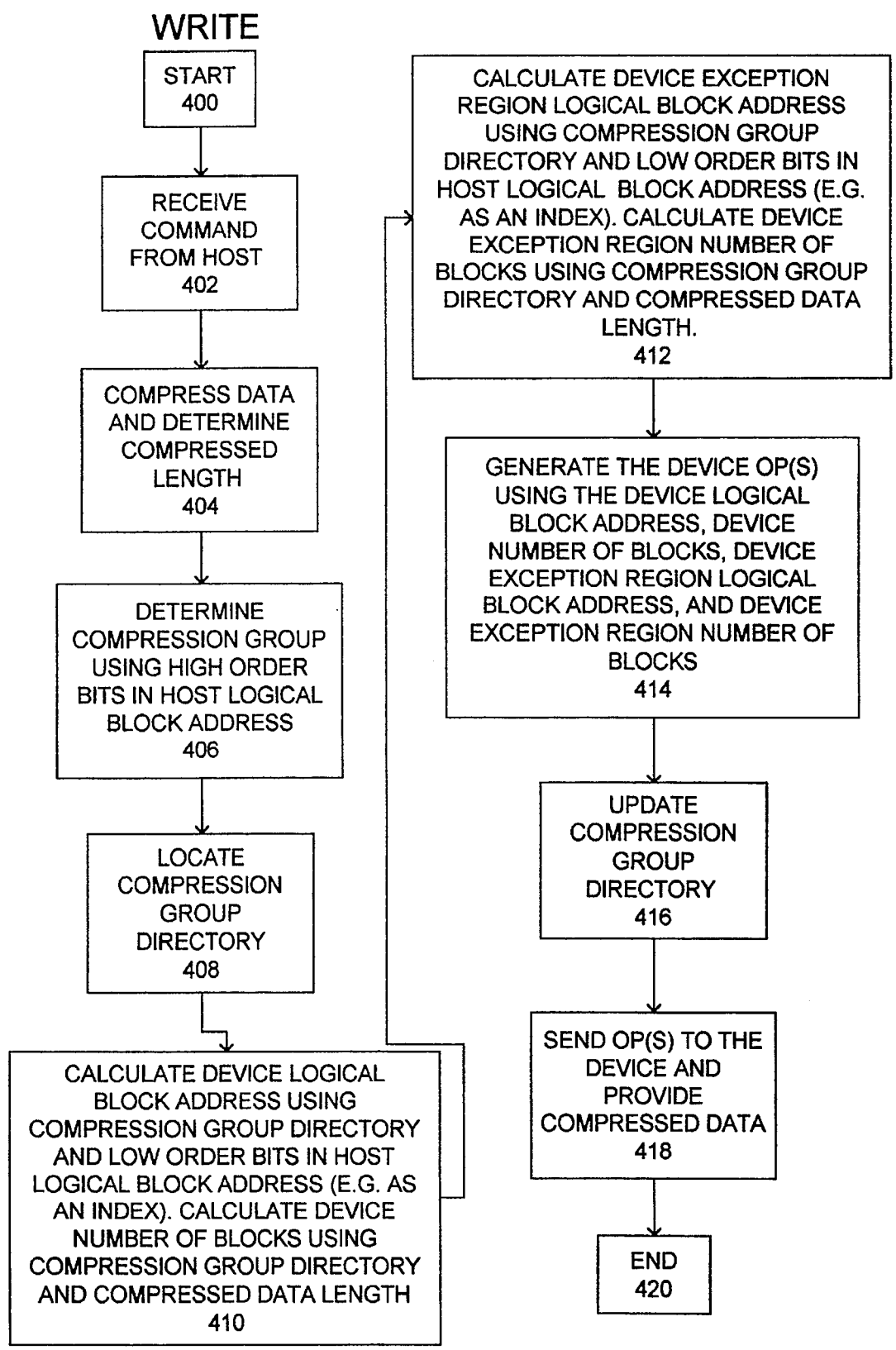

FIG. 4 illustrates sequential operations for a write sequence starting at a block 400. First storage controller 22 receives a write command from the host computer 12 as indicated at a block 402. Storage controller 22 compresses the data to be written and determines the compressed length as indicated at a block 404. Then storage controller 22 determines the compression group 38 using the high order bits in host logical block address as indicated at a block 406. Storage controller 22 locates the compression group in directory 30 as indicated at a block 408. Storage controller 22 calculates the starting physical address or DASD logical block address using the compression group directory 30 and the low order bits in host logical block address, for example, as an index and calculates the number of blocks using compression group directory and compressed data length as indicated at a block 410. If the compressed host pages do not fit in the physical space available, storage controller 22 calculates the exception region logical block address using the compression group directory and low order bits in host logical block address, for example, as an index. Storage controller 22 calculates the device exception region number of blocks using the compression group directory 30 and the compressed data length as indicated at a block 412.

Storage controller 22 generates the device operation or operations using the calculated values for the device logical block address, device number of blocks, device exception region logical block address, and device exception region number of blocks as indicated at a block 414. Next storage controller 22 updates the compression group directory 30 as indicated at a block 416. Storage controller 22 sends the commands or operations to the device 36 and provides the compressed data as indicated at a block 418. This completes the write sequence.

Some localized fragmentation can occur within a compression group 38. No global fragmentation occurs because related data physically resides within one compression group 38. Any localized fragmentation is cleaned up within the compression group 38 at desired intervals. The sweep sequence provides background operations required to periodically rectify localized fragmentation.

Figure 5:
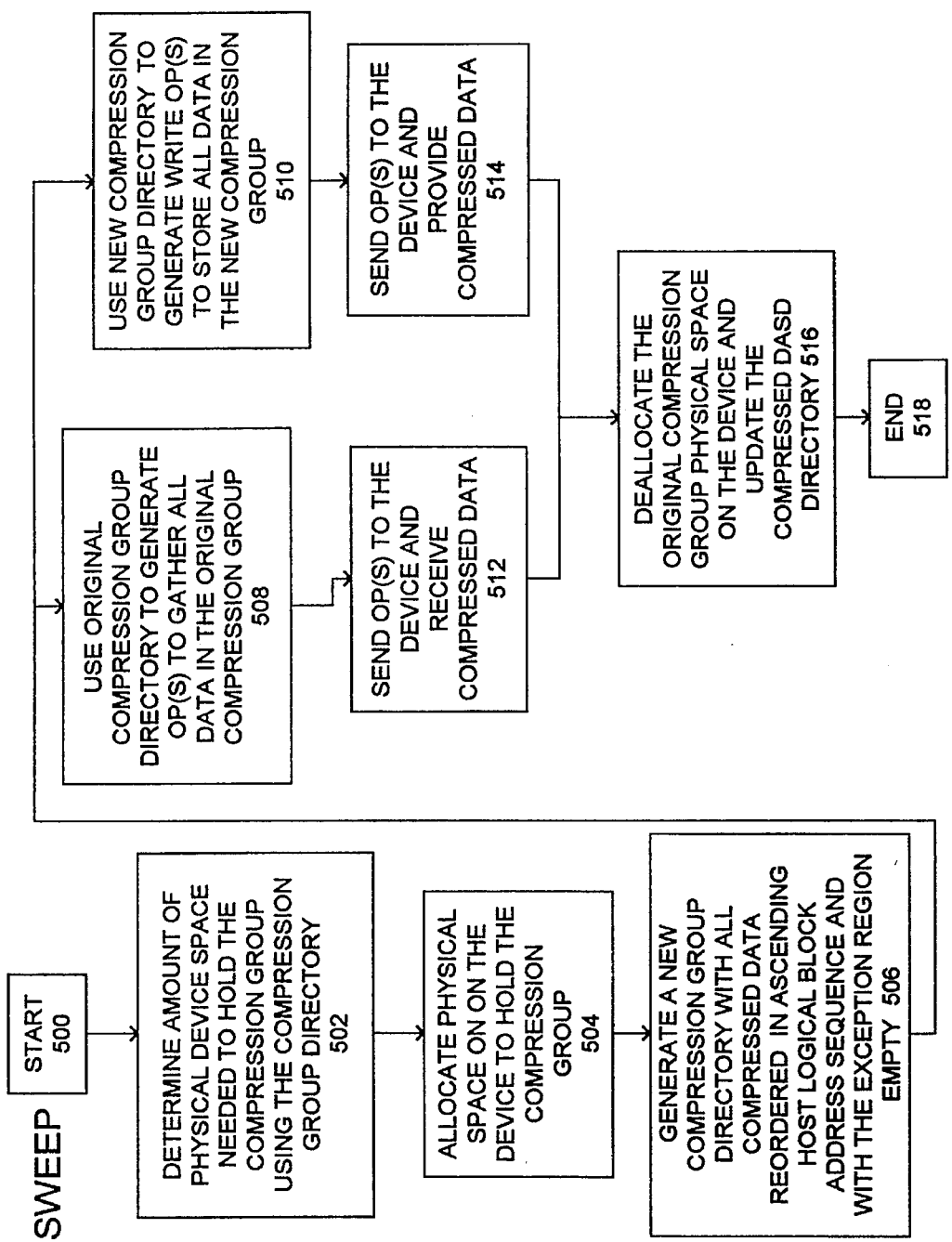

Referring to FIG. 5, there is shown a flowchart illustrating sequential steps for a background sweep operation that is initiated to correct localized fragmentation of the stored compressed data. First storage controller 22 determines the amount of physical device space needed to hold a particular compression group 38 using the compression group directory 30 as indicated at a block 502. Storage controller 22 allocates physical space on the device 36 to hold this compression group 38 as indicated at a block 504. Next storage controller 22 generates a new compression group directory with all compressed data reordered in ascending host logical block address sequence and with the exception region 42 empty as indicated at a block 506. Storage controller 22 uses the original compression group directory 30 to generate read operations to gather all data in the original compression group as indicated at a block 508. Storage controller 22 then uses the new compression group directory to generate write operations to store all data in the new compression group 38 as indicated at a block 510. Storage controller 22 sends operations to the device 36 and receives the compressed data as indicated at a block 512. Storage controller 22 sends operations to the device 36 and provides the compressed data as indicated at a block 514. Storage controller 22 deallocates the original compression group physical space on the device 36 and updates the compressed DASD directory as indicated at a block 516. This completes the sweep sequence.

While the present invention has been described with reference to the details of the embodiments of the invention shown in the drawing, these details are not intended to limit the scope of the invention as claimed in the appended claims.

What is claimed is:

1. A method for storing compressed data in a direct access storage device (DASD) of the type including a fixed block architecture comprising the steps of:

segmenting the DASD into a plurality of compression groups; each of said compression groups having a fixed logical size;

allocating at least one compressed data region and an exception region within each compression group;

writing and reading related compressed data to and from said at least one compressed data region of one of said plurality of compression groups;

writing and reading compressed data exceptions to and from said exception region; said compressed data exceptions including updated compressed data which exceeds an original storage space for corresponding original compressed data; and writing a corresponding directory table within said exception region for each of said compression groups.

2. A method for storing compressed data as recited in claim 1 wherein said step of writing related compressed data to said at least one compressed data region includes the steps of compressing data received from a host computer and identifying a compressed data length.

3. A method for storing compressed data as recited in claim 2 wherein said step of writing related compressed data to said at least one compressed data region includes the steps of identifying one of said compression groups utilizing a host logical block address for the data received from the host computer.

4. A method for storing compressed data as recited in claim 1 wherein said step of writing related compressed data to said at least one compressed data region includes the steps of calculating a DASD logical block address utilizing a compression group directory and said host logical block address, calculating a DASD number of blocks using said compression group directory and said identified compressed data length.

5. A method for storing compressed data as recited in claim 1 wherein said step of writing compressed data exceptions to said exception region includes the steps of:

compressing data received from a host computer and identifying a compressed data length;

identifying one of said compression groups utilizing a host logical block address for the data received from the host computer;

calculating a DASD exception region logical block address utilizing a compression group directory and said host logical block address, and calculating a DASD exception region number of blocks using said compression group directory and said identified compressed data length.

6. A method for storing compressed data as recited in claim 1 further includes the steps of periodically performing a background sweep operation to correct fragmentation within an identified compression group, said fragmentation resulting from compressed data exceptions written to the exception region.

7. A method for storing compressed data as recited in claim 6 wherein said steps of performing a background sweep operation includes the steps of:

identifying an amount of DASD physical space required for the compression group utilizing an original compression group directory, generating a new compression group directory with all compressed data of said identified compression group reordered in ascending host logical block address sequence with said exception region being empty in a new compression group;

utilizing said original compression group directory to gather all data in said identified compression group; and utilizing said generated new compression group directory to store all data in said new compression group.

8. A direct access storage device for storing a compression data structure, said compression data storage comprising:

a plurality of compression groups; each of said compression groups having a fixed logical size;

a directory table written within each of said compression groups;

each compression group having at least one compressed data region on which compressed data can be written; and each compression group having an exception region on which compressed data exceptions can be written; said compressed data exceptions including updated compressed data which exceeds an original storage space for corresponding original compressed data.

9. A direct access storage device as recited in claim 8 wherein said compression group includes a plurality of compression pages.

10. A direct access storage device as recited in claim 8 wherein said compression pages have a logical size equal to a host system page size.

11. A direct access storage device as recited in claim 8 wherein each of said at least one compressed data region includes a fixed number of sectors.

12. A direct access storage device as recited in claim 9 wherein each of said at least one compressed data region includes a variable number of said compression pages.

13. A direct access storage device as recited in claim 2 wherein said exception region contains said directory table.

14. A direct access storage device as recited in claim 8 wherein said compression group contains a variable number of said at least one compressed data regions.

15. A direct access storage device as recited in claim 9 wherein said compression pages span adjacent compression regions.

16. A direct access storage device as recited in claim 10 wherein said compression group size includes 1 MB with said compression page logical size and said host system page size of 4 KB.

17. A system for reading and writing compressed data comprising:

a host computer for providing and receiving data to a direct access storage device, said host computer including a direct access storage device storage management function and a logical directory for storing logical block addresses;

a storage controller coupled to said host computer for receiving and compressing data and writing compressed data to the direct access storage device and for reading and decompressing compressed data from the direct access storage device and providing the data to said host computer;

said direct access storage device including a plurality of compression groups; each of said compression groups having a fixed logical size;

a directory table written within each of said compression groups;

each compression group having at least one compressed data region on which compressed data can be written; and each compression group having an exception region on which compressed data exceptions can be written; each of said compressed data exceptions including updated compressed data which exceeds an original storage space for corresponding original compressed data.

18. A system for reading and writing compressed data as recited in claim 17 wherein said storage controller includes a compression group directory cache and receives a logical block address from said host computer.

19. A system for reading and writing compressed data as recited in claim 18 wherein said storage controller includes compression management logic for identifying a logical block address within said direct access storage device utilizing said received host computer logical block address.

20. A system for reading and writing compressed data as recited in claim 17 further includes means for periodically performing a background sweep operation to correct fragmentation within an identified compression group, said fragmentation resulting from compressed data exceptions written to the exception region.

* * * * *